(12) United States Patent
Krashinsky

(10) Patent No.: US 9,830,156 B2
(45) Date of Patent: Nov. 28, 2017

(54) TEMPORAL SIMT EXECUTION OPTIMIZATION THROUGH ELIMINATION OF REDUNDANT OPERATIONS

(75) Inventor: Ronny M. Krashinsky, San Francisco, CA (US)

(73) Assignee: NVIDIA Corporation, Santa Clara, CA (US)

( * ) Notice: Subject to any disclaimer, the term of this patent is extended or adjusted under 35 U.S.C. 154(b) by 800 days.

(21) Appl. No.: 13/209,189

(22) Filed: Aug. 12, 2011

(65) Prior Publication Data

US 2013/0042090 A1 Feb. 14, 2013

(51) Int. Cl.
*G06F 9/30* (2006.01)
*G06F 9/38* (2006.01)

(52) U.S. Cl.
CPC .......... *G06F 9/3836* (2013.01); *G06F 9/3016* (2013.01); *G06F 9/3851* (2013.01); *G06F 9/3887* (2013.01)

(58) Field of Classification Search
CPC .... G06F 9/3836; G06F 9/3016; G06F 9/3851; G06F 9/3887
USPC .......................................................... 712/22
See application file for complete search history.

(56) References Cited

U.S. PATENT DOCUMENTS

| | | | | |
|---|---|---|---|---|
| 4,435,758 A | * | 3/1984 | Lorie | G06F 9/3009 712/233 |
| 5,423,051 A | * | 6/1995 | Fuller | G06F 9/30043 712/7 |
| 5,625,834 A | * | 4/1997 | Nishikawa | G06F 9/30036 712/9 |
| 5,940,625 A | | 8/1999 | Smith | |
| 6,839,828 B2 | * | 1/2005 | Gschwind | G06F 9/30043 712/20 |
| 7,353,369 B1 | * | 4/2008 | Coon | G06F 9/30101 712/220 |
| 7,617,384 B1 | * | 11/2009 | Coon | G06F 9/3851 712/220 |

(Continued)

OTHER PUBLICATIONS

Lee et al., "Exploring the tradeoffs between programmability and efficiency in data-parallel accelerators", Jun. 2011, ISCA '11 Proceedings of the 38th annual international symposium on Computer architecture, pp. 129-140.*

(Continued)

*Primary Examiner* — Yuqing Xiao
(74) *Attorney, Agent, or Firm* — Artegis Law Group, LLP

(57) ABSTRACT

One embodiment of the present invention sets forth a technique for optimizing parallel thread execution in a temporal single-instruction multiple thread (SIMT) architecture. When the threads in a parallel thread group execute temporally on a common processing pipeline rather than spatially on parallel processing pipelines, execution cycles may be reduced when some threads in the parallel thread group are inactive due to divergence. Similarly, an instruction can be dispatched for execution by only one thread in the parallel thread group when the threads in the parallel thread group are executing a scalar instruction. Reducing the number of threads that execute an instruction removes unnecessary or redundant operations for execution by the processing pipelines. Information about scalar operands and operations and divergence of the threads is used in the instruction dispatch logic to eliminate unnecessary or redundant activity in the processing pipelines.

26 Claims, 9 Drawing Sheets

(56) References Cited

U.S. PATENT DOCUMENTS

| | | | | |
|---|---|---|---|---|
| 7,634,637 | B1* | 12/2009 | Lindholm | G06F 9/3851 |
| | | | | 712/13 |
| 7,836,276 | B2* | 11/2010 | Coon | G06F 9/3838 |
| | | | | 712/10 |
| 9,672,035 | B2* | 6/2017 | Pedersen | G06F 9/30036 |
| 2003/0037221 | A1* | 2/2003 | Gschwind | G06F 9/30043 |
| | | | | 712/3 |
| 2006/0020772 | A1* | 1/2006 | Hussain | G06F 9/3017 |
| | | | | 712/210 |
| 2008/0313424 | A1* | 12/2008 | Gschwind | G06F 9/30036 |
| | | | | 712/23 |
| 2009/0113181 | A1 | 4/2009 | Comparan et al. | |
| 2009/0240895 | A1* | 9/2009 | Nyland | G06F 9/3824 |
| | | | | 711/149 |
| 2009/0240931 | A1 | 9/2009 | Coon et al. | |
| 2010/0332792 | A1* | 12/2010 | Clifton | G06F 9/3012 |
| | | | | 712/4 |
| 2011/0078415 | A1* | 3/2011 | Johnson | G06F 9/30021 |
| | | | | 712/208 |
| 2011/0219221 | A1* | 9/2011 | Skadron | G06F 9/3851 |
| | | | | 712/235 |
| 2016/0371093 | A1* | 12/2016 | Chang | G06F 15/78 |

OTHER PUBLICATIONS

Krashinsky et al., "The Vector-Thread Architecture", Mar. 2004, ISCA'04 Proceedings of the 31st annual international symposium on Computer architecture, re-print, pp. 1-12.*

Michael Steffen and Joseph Zambreno, "Improving SIMT Efficiency of Global Rendering Algorithms with Architectural Support for Dynamic Micro-Kernels," Dec. 2010, 43rd Annual IEEE/ACM International Symposium on Microarchitecture, pp. 237-248.*

J.E. Smith, et al., "Vector Instruction Set Support for Conditional Operations", International Symposium on Computer Architecture (ISCA), Jun. 2000, http://jes.ece.wisc.edu/papers/isca00.smith.pdf, pp. 10 total.

K. Asanovic, "Vector Microprocessors", Ph.D. Thesis, EECS Department, University of California, Berkeley, 1998, http://www.eecs.berkeley.edu/~krste/thesis.pdf, pp. 268 total.

Christopher Francis Batten, "Simplified Vector-Thread Architectures for Flexible and Efficient Data-Parallel Accelerators", Ph.D. Thesis, EECS Department, Massachusetts Institute of Technology, Feb. 2010, http://www.eecs.berkeley.edu/~krste/papers/cbatten-phd-thesis.pdf, pp. 170 total.

Sylvain Collange et al., "Dynamic Detection of Uniform and Affine Vectors in GPGPU Computations", Europar 3rd Workshop on Highly Parallel Processing on a Chip, 2009, http://perso.ens-lyon.fr/sylvain.collange/papers/CoDeZh_HPPC2009.pdf, pp. 10 total.

GB Search and Examination Report dated Nov. 12, 2012, Application No. GB1212640.5.

Guoping Long et al.—"Minimal Multi-Threading: Finding and Removing Redundant Instructions in Multi-Threaded Processors," Proceedings of the 43rd Annual IEEE/ACM International Symposium on Microarchitecture, Dec. 4-8, 2010, pp. 337-348.

Dally, Bill, "From Here to ExaScale—Challenges and Potential Solutions", In: The Salishan Conference on High-Speed Computing, Apr. 25, 2011, pp. 1, 28, 30. http://www.lanl.gov/orgs/hpc/salishan/salishan2011/1dally.pptx [called up on Mar. 20, 2014].

Collange, Sylvain, "Identifying scalar behavior in CUDA kernels", Inria Grenoble Rhone—Alpes: LIP Laboratoire de l'informatique du Parallélisme, Jan. 12, 2011. URL: http://hal.archivesouvertes.fr/docs/00/55/51/34/PDF/collange_scalarizing_compiler_rr.pdf [called up on Mar. 20, 2014].

Hong-Yun, Kim; Young-Jun, Kim; Lee-Sup, Kim, "Reconfigurable mobile stream processor for ray tracing", In: 2010 IEEE Custom Integrated Circuits Conference (CICC), 2010, pp. 1 to 4.—ISSN 0886-5930 http://ieeexplore.ieee.org/stamp/stamp.jsp?tp=&arnumber=5617395 [called up on Mar. 20, 2014].

Collange, Sylvain, "Multi-threading or SIMD?—How GPU architectures exploit regularity", In: ARHI'11, Jun. 14, 2011, pp. 1,15,18,34-37,40,41,44,45,68,72. http://www.irisa.fr/alf/downloads/collange/talks/archi1_scollange.pdf [called up on Mar. 20, 2014].

Collange, Sylvain; Defour, David; Zhang, Yao: Dynamic detection of uniform and affine vectors in GPGPU computations. In: Euro-Par 2009—Parallel Processing Workshops, 6043, 2009, pp. 1 to 11. http://hal.archivesouvertes.fr/docs/00/39/67/19/PDF/barra_europar.pdf [called up on Mar. 20, 2014].

\* cited by examiner

TEMPORAL SIMT EXECUTION OPTIMIZATION THROUGH ELIMINATION OF REDUNDANT OPERATIONS

GOVERNMENT RIGHTS IN THIS INVENTION

This invention was made with U.S. government support under contract number No. HR0011-10-9-0008 awarded by DARPA. The U.S. government has certain rights in this invention.

BACKGROUND OF THE INVENTION

Field of the Invention

The present invention generally relates to single-instruction multiple-thread (SIMT) execution and more specifically to optimization of temporal SIMT execution.

Description of the Related Art

Conventional SIMT multithreaded processors provide parallel execution of multiple threads by organizing threads into groups and executing each thread on a separate processing pipeline. An instruction for execution by the threads in a group dispatches in a single cycle. The processing pipeline control signals are generated such that all threads in a group perform a similar set of operations as the threads traverse the stages of the processing pipelines. For example, all the threads in a group read source operands from a register file, perform the specified arithmetic operation in processing units, and write results back to the register file.

When divergence is permitted between different threads in the same group some of the parallel processing pipelines are idle while threads that take the branch are executed and the remaining parallel processing pipelines are idle while the threads that did not take the branch are executed. The utilization of the parallel processing pipelines may be significantly reduced when execution of threads in a group diverges. In the worst case, only a single thread is dispatched for execution on the parallel processing pipelines.

Accordingly, what is needed in the art is an improved system and method for utilizing processing resources in a multithreaded processing architecture when threads may diverge.

SUMMARY OF THE INVENTION

One embodiment of the present invention sets forth a technique for optimizing temporal SIMT execution of parallel threads. Utilization of processing resources is improved when threads are allowed to diverge by using a multi-threaded processing architecture with temporal execution compared with a conventional multithreaded processing architecture. When the threads in a parallel thread group execute temporally on a common processing pipeline rather than spatially on parallel processing pipelines (one processing pipeline per thread), execution cycles may be reduced when some threads in the parallel thread group are inactive due to divergence. Similarly, an instruction can be dispatched for execution by only one thread in the parallel thread group when the threads in the parallel thread group are executing a scalar instruction. Information about scalar operands and operations and divergence of the threads is used in the instruction dispatch logic to eliminate unnecessary or redundant activity in the processing pipelines.

Various embodiments of a method of the invention for executing an instruction for a thread group includes receiving the instruction for execution by threads in the thread group, evaluating the instruction to identify scalar characteristics, and dispatching the instruction for execution by a portion of the threads in the thread group based on the scalar characteristics.

Reducing the number of threads that execute an instruction removes unnecessary or redundant operations for execution by the processing pipelines. Therefore, the processing pipeline utilization is improved and performance may also be increased.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
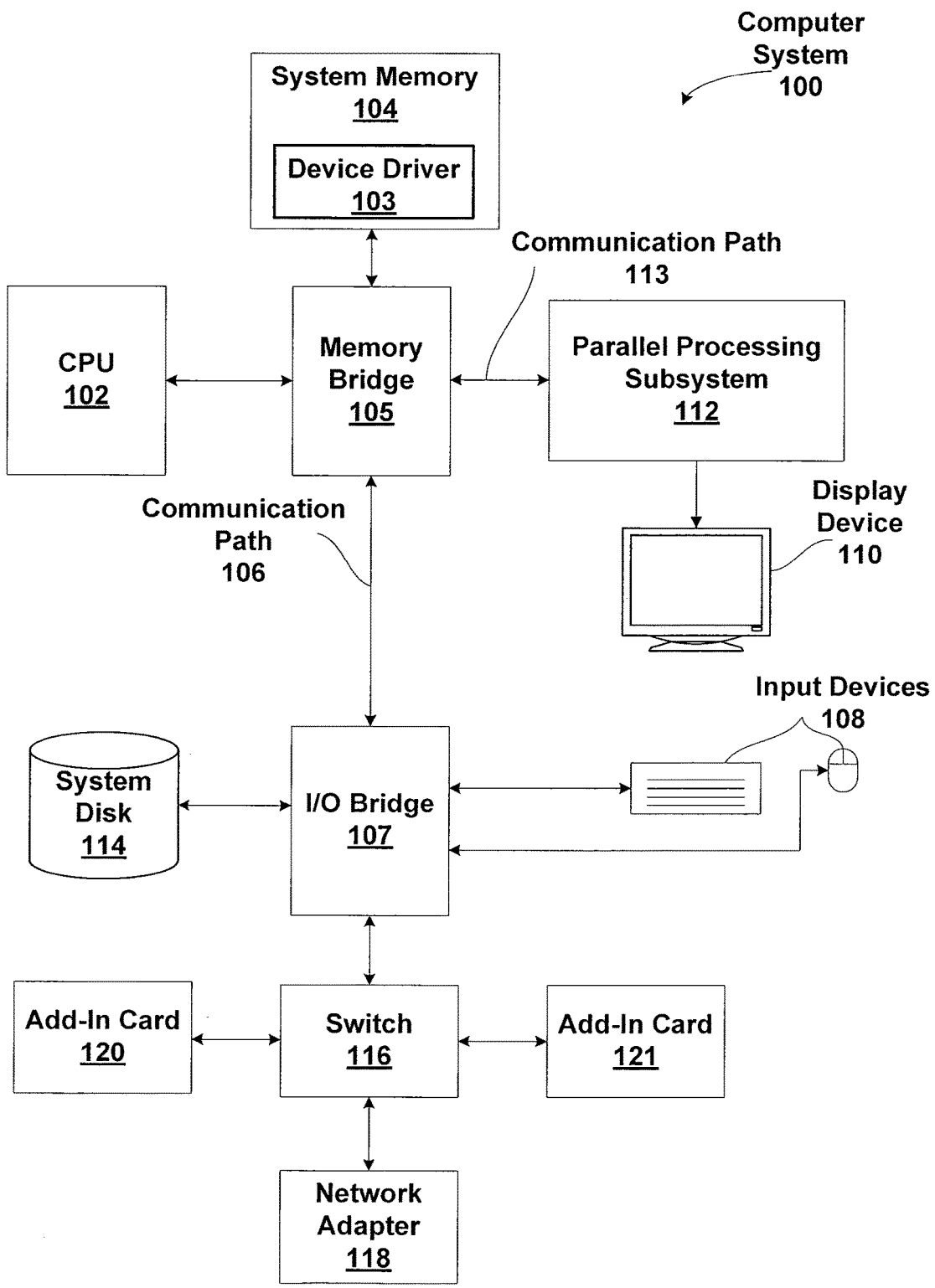
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
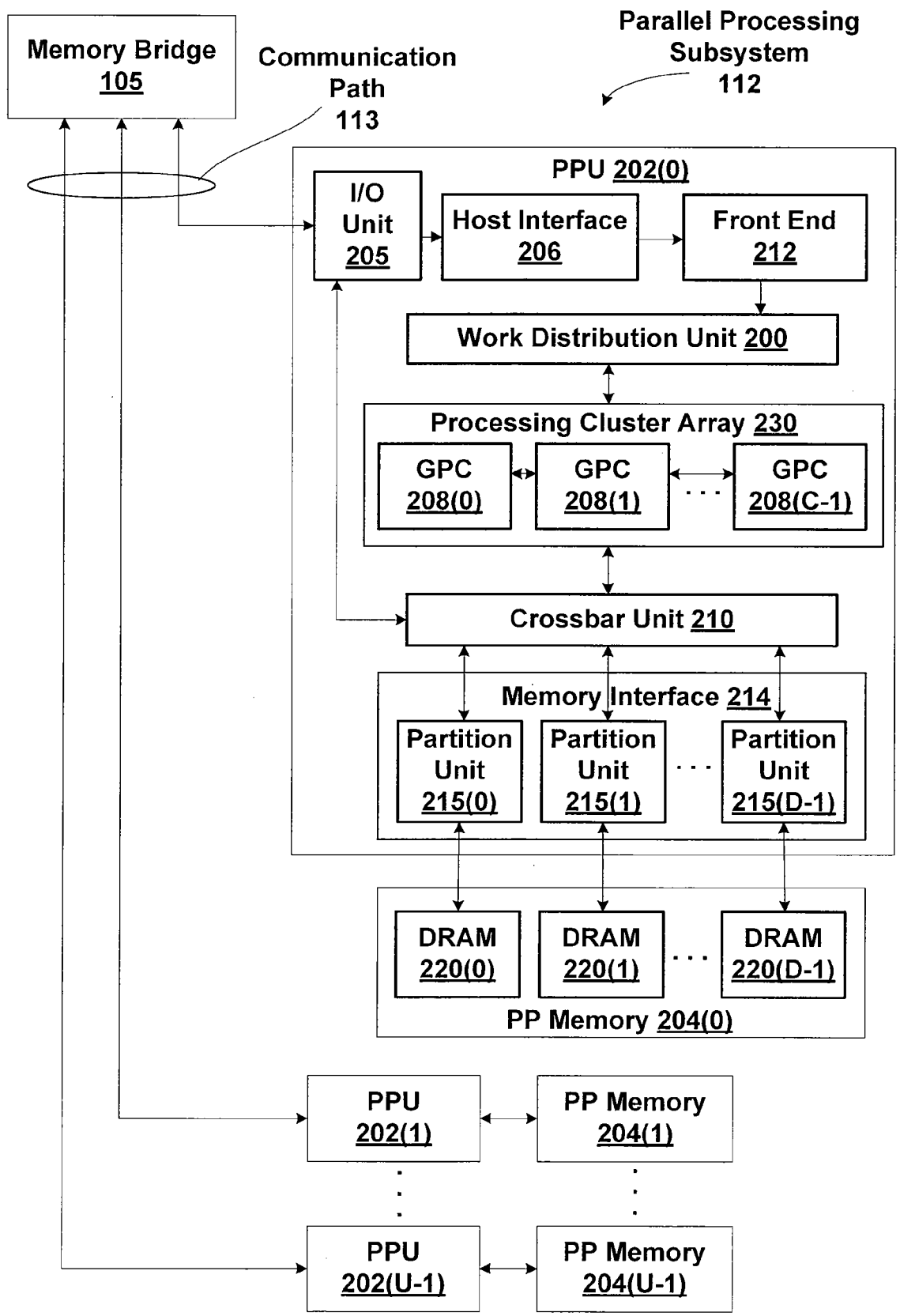
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where $U \geq 1$. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and communications path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where $C \geq 1$. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform patch tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in pixel space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
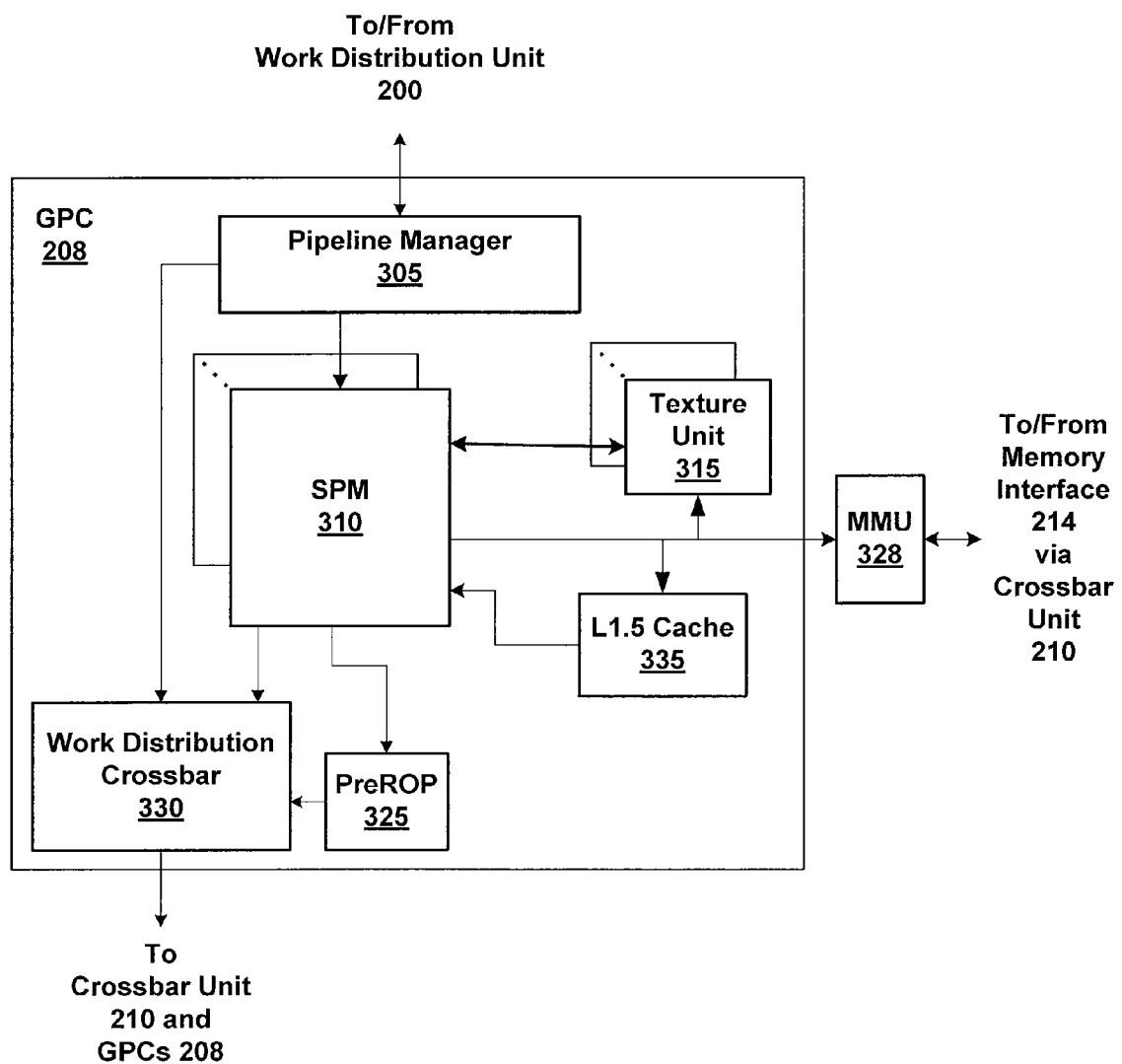
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≥1, each SPM 310 configured to process one or more thread groups. Also, each SPM 310 advantageously includes an identical set of functional execution units (e.g., execution units and load-store units—shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to G*M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 contains an L1 cache (not shown) or uses space in a corresponding L1 cache outside of the SPM 310 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory. Additionally, an L1.5 cache 335 may be included within the GPC 208, configured to receive and hold data fetched from memory via memory interface 214 requested by SPM 310, including instructions, uniform data, and constant data, and provide the requested data to SPM 310. Embodiments having multiple SPMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SPM 310 or the L1 cache or GPC 208. The physical address is processed to distribute surface data access locality to allow efficient request interleaving among partition units. The cache line index may be used to determine whether of not a request for a cache line is a hit or miss.

In graphics and computing applications, a GPC 208 may be configured such that each SPM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SPM 310 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SPMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3B:
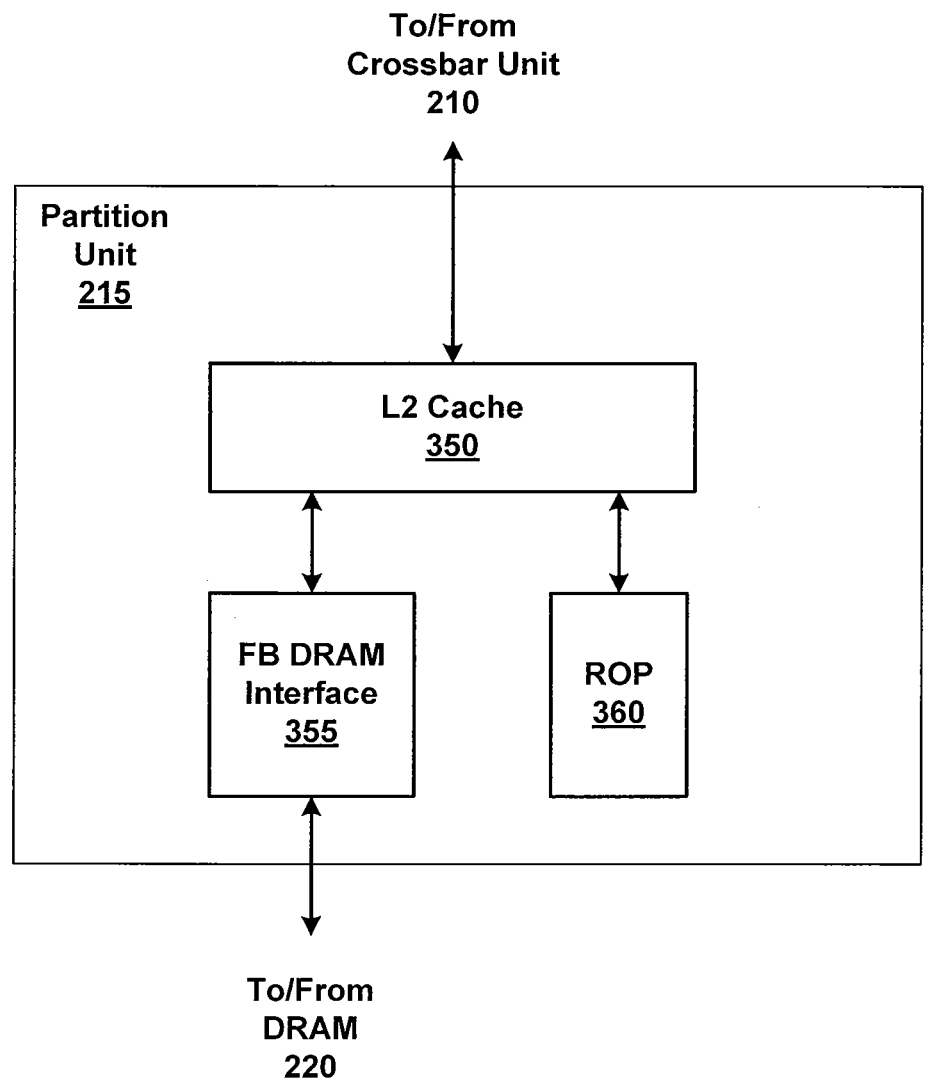
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
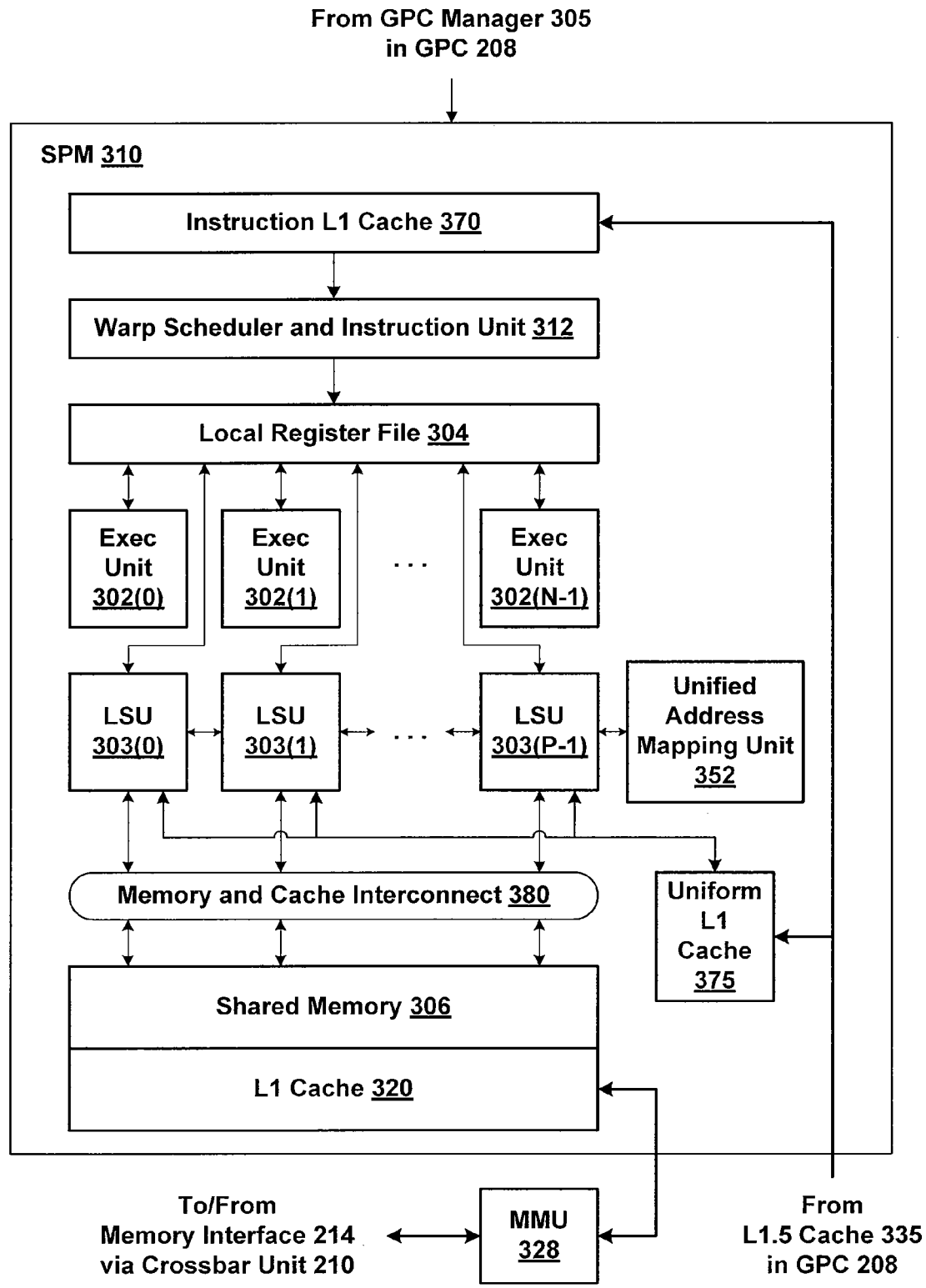
FIG. 3C is a block diagram of a portion of the SPM of FIG. 3A, according to one embodiment of the present invention.

FIG. 3C is a block diagram of the SPM 310 of FIG. 3A, according to one embodiment of the present invention. The SPM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SPM 310 functional units according to the instructions and constants. The SPM 310 functional units include N exec (execution or processing) units 302 and P load-store units (LSU) 303.

SPM 310 provides on-chip (internal) data storage with different levels of accessibility. Special registers (not shown) are readable but not writeable by LSU 303 and are used to store parameters defining each CTA thread's "position." In one embodiment, special registers include one register per CTA thread (or per exec unit 302 within SPM 310) that stores a thread ID; each thread ID register is accessible only by a respective one of the exec unit 302. Special registers may also include additional registers, readable by all CTA threads (or by all LSUs 303) that store a CTA identifier, the CTA dimensions, the dimensions of a grid to which the CTA belongs, and an identifier of a grid to which the CTA belongs. Special registers are written during initialization in response to commands received via front end 212 from device driver 103 and do not change during CTA execution.

A parameter memory (not shown) stores runtime parameters (constants) that can be read but not written by any CTA thread (or any LSU 303). In one embodiment, device driver 103 provides parameters to the parameter memory before directing SPM 310 to begin execution of a CTA that uses these parameters. Any CTA thread within any CTA (or any exec unit 302 within SPM 310) can access global memory through a memory interface 214. Portions of global memory may be stored in the L1 cache 320.

Local register file 304 is used by each CTA thread as scratch space; each register is allocated for the exclusive use of one thread, and data in any of local register file 304 is accessible only to the CTA thread to which it is allocated. An exception is when the local register file 304 includes one or more scalar registers. Scalar registers may be accessed by all threads in a thread group so that multiple registers are not needed to store the same scalar value for each thread in the thread group. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers.

Shared memory 306 is accessible to all CTA threads (within a single CTA); any location in shared memory 306 is accessible to any CTA thread within the same CTA (or to any processing engine within SPM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and grid ID, as well as CTA and grid dimensions, implementing portions of the special registers. Each LSU 303 in SPM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 Cache 320 in each SPM 310 can be used to cache private per-thread local data and also per-application global data. In some embodiments, the per-CTA shared data may be cached in the L1 cache 320. The LSUs 303 are coupled to a uniform L1 cache 375, the shared memory 306, and the L1 cache 320 via a memory and cache interconnect 380. The uniform L1 cache 375 is configured to receive read-only data and constants from memory via the L1.5 Cache 335.

Temporal SIMT Execution Optimization

As previously described, GPUs provide a convenient and flexible MIMD programming model on SIMD hardware through SIMT execution of thread groups. The threads within a thread group may diverge because the SPM 310 dynamically handles per-thread control flow as the thread groups execute on parallel execution units 302. In a spatial SIMT architecture, as shown in FIG. 3C, the number of execution units 302 may equal the number of threads in a thread group, and instructions are dispatched each cycle. In a temporal SIMT architecture, the threads in a thread group are time-multiplexed on a smaller number of execution units 302. For example, in an SPM 310 having four parallel execution units 302 and 32 threads in a thread group, the instruction for the thread group is dispatched over eight successive cycles.

When a spatial SIMT architecture is used performance is typically reduced when threads in a thread group diverge, i.e., follow different control-flow paths, and scalar operations are executed redundantly across threads in the thread group, resulting in inefficiencies in performance and power consumption. Temporal SIMT execution may be used to improve efficiencies in performance and power consumption. When the threads in a thread group execute temporally on a single exec unit 302 rather than spatially on parallel exec units 302, the instruction may be executed once for the thread group instead of once for each thread when the instruction is identified as a scalar instruction. When some threads in the thread group are inactive due to divergence, instructions are only dispatched for execution by the active threads in the thread group. Divergence occurs when one or more threads in a thread group execute instructions that are not executed by all of the threads in the thread group. Divergence may be caused by if-then constructs, case statements, jump instructions, and other conditional operations. In sum, divergence information and scalar information is used to optimize temporal execution of parallel instructions by eliminating unnecessary or redundant activity in the exec units 302 and the local register file 304.

Figure 4A:
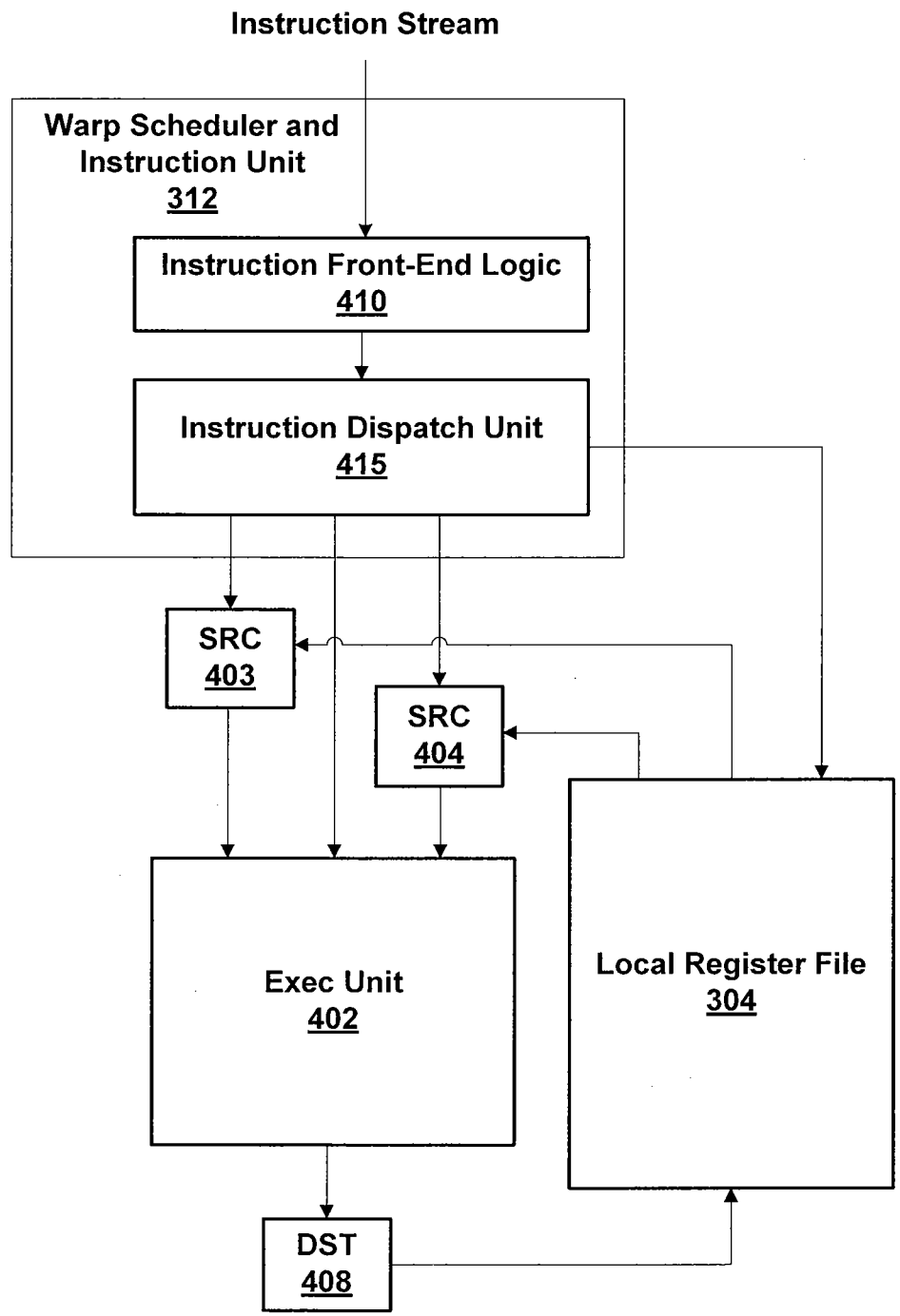
FIG. 4A is a block diagram of a portion of the SPM of FIG. 3A that is configured for temporal SIMT execution, according to one embodiment of the present invention.

FIG. 4A is a block diagram of a portion of the SPM 310 of FIG. 3A that is configured for temporal SIMT execution within a single exec unit 302, according to one embodiment of the present invention. A SIMT instruction goes through various pipeline stages within the SPM 310 as the instruction is executed in a temporal SIMT architecture. The warp scheduler and instruction unit 312 includes an instruction front-end logic 410 and an instruction dispatch unit 415. The instruction front-end logic 410 receives an instruction stream and is configured to output a new SIMT instruction each cycle. When a SIMT instruction reaches the instruction dispatch unit 415, the SIMT instruction may expand temporally over several cycles. As shown in FIG. 4A, a single processing pipeline is used that includes an execution (exec) unit 402, two source (SRC) operand input pipeline registers 403 and 404, and a single destination (DST) operand output pipeline register 408. The warp scheduler and instruction unit 312 reads operands stored in source registers from the local register file 304 and temporarily stores the operands in the SRC operand input pipeline registers 403 and 404. After processing by the exec unit 402, the result of a SIMT instruction is temporarily stored in the DST operand output pipeline register 408. The warp scheduler and instruction unit 312 then transfers the data stored in the DST operand output pipeline register 408 to the destination register in the local register file 304 and stores the data in the destination register. In other embodiments, one or more additional or fewer SRC operand input pipeline registers are used and one or more additional DST operand output pipeline registers are used.

When a single exec unit 402 is used in the temporal SIMT architecture, the SIMT instruction may be dispatched once for each thread in the thread group when all of the threads must execute the instruction. In some circumstances, the SIMT instruction may be dispatched for a single cycle, in multiple cycles for only a portion of the threads, or not at all. In a temporal SIMT architecture having four parallel processing pipelines and 32 threads in a thread group, a SIMT instruction is dispatched over 8 successive cycles when all of the threads must execute the SIMT instruction. Each cycle a new dispatch sub-group of threads begins execution in parallel; threads 0-3 in the first dispatch cycle, threads 4-7 in the second dispatch cycle, etc. If, in some circumstances, all of the threads in a dispatch sub-group do not need to execute the SIMT instruction, then the SIMT instruction is not dispatched for that dispatch sub-group. Compared with a spatial SIMT architecture, the exec units 302 and 402 are more efficiently utilized.

Conventional temporal execution architectures implement a rigid scheduling of operations. For example, a conventional temporal execution architecture always dispatches each SIMT instruction for every thread in the thread group. Furthermore, control signals are generated such that all threads perform a similar set of operations as they traverse the pipeline stages. For example, all the threads in a thread group read source operands from a register file, perform the specified arithmetic operation in execution units, and write results back to the register file.

In contrast, the instruction dispatch unit 415 is optimized to eliminate unnecessary or redundant operations. The optimization may include power reduction through eliminating operations such as local register file 304 reads and writes. When an exec unit 302 is in parallel with at least one other exec unit 302 that is idle for a thread clocking of pipeline registers in the idle exec unit 302 may be eliminated to reduce power consumption. The instruction dispatch unit 415 may also be configured to eliminate dispatch cycles from the execution schedule to improve instruction throughput for one or more threads in a thread group.

Execution divergence occurs when the threads in a thread group branch independently and follow different control-flow paths. To handle divergence, the warp scheduler and instruction unit 312 maintains a stack of warp program counters, together with active masks indicating which threads in the thread group should execute the target instruction. A divergent branch instruction results in two program counters and two active masks for the taken and not-taken paths respectively, and one set is pushed onto the stack while threads execute instructions using the other set of program counter and active mask. The warp scheduler and instruction unit 312 executes warps with one program counter and one active mask at a time, and handles divergence and re-convergence by pushing and popping program counters and active masks from the stack.

When a divergent warp executes on conventional spatial and temporal SIMT architectures, instructions are dispatched even for inactive threads, thereby reducing processing performance. For example, when only four threads are active in a thread group of 32 threads, utilization of the processing pipeline drops from 100% to 12.5%. Divergence is a major performance pitfall for multithreaded processors, and programmers need to be diligent to keep threads coherent in order to optimize throughput.

To optimize efficiency in the presence of execution divergence, the instruction dispatch unit 415 utilizes the active mask for the thread group to control which threads execute each SIMT instruction. Instead of dispatching a SIMT instruction over a fixed number of cycles for execution by all of the threads in a thread group, the instruction dispatch unit 415 may dispatch a SIMT instruction over fewer cycles when some threads in the thread group are inactive. In one embodiment, the instruction dispatch unit 415 is configured to not dispatch the SIMT instruction for dispatch sub-groups of sequential threads that are inactive according to the active mask. When the local register file 304 supports independent indexing per thread, another embodiment selects non-sequential active threads for dispatch each cycle. As a further optimization, the instruction dispatch unit 415 may also consider predication register values and an instruction predication field in determining threads that do not execute the SIMT instruction and further reduce the number of cycles for which the SIMT instruction is dispatched.

TABLE 1 shows an example execution timeline in which unnecessary dispatch cycles are eliminated, allowing an SPM 310 to execute more SIMT instructions in a given period of time. The control logic optimizations may be based on various inputs such as divergence information, e.g., an active mask for the thread group, predication register values, or scalar information, e.g., instruction flags, particular opcodes, and register specifiers. The active mask indicates which threads in a thread group are active and should execute the SIMT instruction. The example shown in TABLE 1 is an SPM configured to dispatch a SIMT instruction for execution by a single thread each cycle where eight threads are in a thread group.

TABLE 1

SIMT instruction dispatch timeline

| Input Stream | Input to Dispatch | Dispatch Output |
| --- | --- | --- |
| I1 | | |
| I2 | I1 | |
| I3 | I2 | I1 thread1 |
| — | — | I1 thread3 |
| — | — | I1 thread4 |
| I4 | I3 | I2 thread1 |
| — | I4 | I3 thread1 |
| — | — | I3 thread2 |
| — | — | I3 thread3 |
| — | — | I3 thread4 |
| — | — | I3 thread5 |
| — | — | I3 thread6 |
| — | — | I3 thread7 |
| | — | I3 thread8 |
| | | I4 thread2 |
| | | I4 thread5 |
| | | I4 thread6 |
| | | I4 thread7 |
| | | I4 thread8 |

Based on the active mask, the instruction dispatch unit 415 outputs the first SIMT instruction, I1 is output for thread1, thread3, and thread4. The instruction front-end logic 410 stalls and cannot accept a new input instruction while the instruction dispatch unit 415 outputs the first SIMT instruction for multiple cycles.

In a SIMT architecture, threads often redundantly execute an instruction that performs scalar bookkeeping operation or that receives common scalar operands. Examples include common control-flow instructions like the counter increment and conditional branch for a counted loop. Other examples include memory address calculations, such as calculating base addresses when the threads in a thread group are operating on vectors and matrices.

The second instruction, I2, shown in TABLE 1 is a scalar SIMT instruction, meaning that all of the threads in the thread group would execute an instruction that will produce the same result. Therefore, the second instruction is only executed for one thread (thread1) on behalf of all of the active threads in the thread group. The instruction dispatch unit 415 determines that the third instruction, I3 should be executed by all of the eight threads in the thread group. Therefore, the third SIMT instruction is output for each one of the eight threads. The fourth instruction, I4 is output to five of the eight threads based on the active mask. The instruction font-end logic 410 stalls and cannot accept a new input instruction while the instruction dispatch unit 415 outputs the third and fourth SIMT instructions for multiple cycles.

TABLE 1 demonstrates how a SIMT instruction may be output by the instruction dispatch unit 415 for a variable number of cycles. The instruction front-end logic 410 should be designed to account for this variability, for example by stalling until the instruction dispatch unit 415 is ready to accept a new instruction. As an alternative to stalling the early stages of the SPM 310, queues may be used to decouple different processing units. For example, a small queue may be located between the instruction front-end logic 410 and the instruction dispatch unit 415.

Figure 4B:
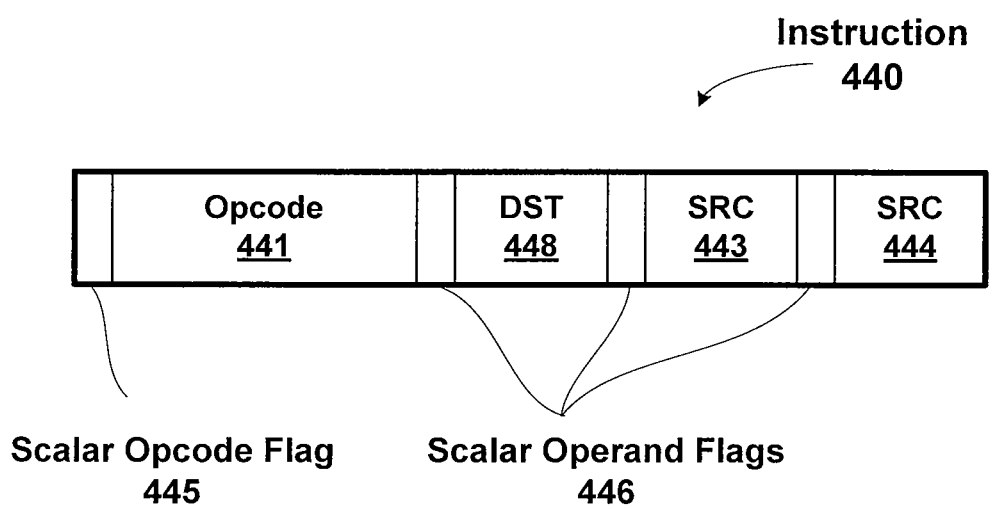
FIG. 4B illustrates the format of a SIMT instruction, according to one embodiment of the invention.

FIG. 4B illustrates the format of a SIMT instruction 440, according to one embodiment of the invention. To enable optimizations related to scalarization, there are various ways in which operands or operations may be identified as scalar for the threads in a thread group. A compiler may identify uniform instructions and/or uniform operands (also called scalars) and communicate scalar information through flags either in or associated with an instruction. One or more registers may be defined (indexed with certain register specifiers) that are logically or physically shared by threads in a thread group and that are defined as scalar registers. Likewise, one or more instruction opcodes may be defined as scalar operations that result in scalar instructions. In other cases, the warp scheduler and instruction unit 312 may dynamically track scalar operands and operations (or instructions). For example, the warp scheduler and instruction unit 312 may set and propagate flags to identify uniform (or scalar) registers. The warp scheduler and instruction unit 312 may set the flags based on execution of certain instructions which are defined to produce scalar results (such as a load-uniform instruction). In other implementations the warp scheduler and instruction unit 312 may compare actual data values stored in the registers specified by the instruction operands to determine if the operand and/or the instruction is scalar.

As shown in FIG. 4B the SIMT instruction 440 includes a scalar opcode flag 445 that indicates if an opcode 441 is scalar. When the opcode 441 is scalar, the SIMT instruction 440 is also scalar. The scalar operand flags 446 indicate if each of the DST operand 448, SRC operand 443, and the SRC operand 444, respectively, are scalar. When the DST operand 448 is scalar the SIMT instruction 440 is also scalar. When there are multiple DST operands, all of the DST operands must be scalar for the SIMT instruction 440 to be a scalar instruction. In another embodiment, specific opcodes and/or SRC or DST operands may be predefined as scalar so that the scalar opcode flag 445 and/or scalar operand flags 446 are not needed.

In one embodiment, a separate scalar unit is used to perform scalar operations to optimize efficiency in a SIMT architecture. A scalar register file may be configured to store scalar operands, and dedicated scalar execution units are configured to perform scalar operations. A drawback of this approach is that the scalar register file and scalar unit are additional circuitry that is dedicated only to scalar processing. Furthermore, scalar operands need to be routed to the processing pipelines to be used as sources for regular parallel SIMT instructions. In another embodiment, scalar operations are performed in the exec unit 402 and 302, scalar operands are stored in the local register file 304, and scalar execution is optimized temporally rather than spatially.

The instruction dispatch unit 415 utilizes information about scalar operands and scalar operations, in addition to the active mask, to eliminate unnecessary or redundant processing or register read and write operations. When any source operands 443 or 444 are identified as scalar, the scalar SRC operands do not need to be read from the local register file 304 each cycle that the SIMT instruction 440 is dispatched. Scalar SRC operands may be transferred into the SRC pipeline registers 403 and/or 404 once, when the SIMT instruction 440 is dispatched for the first thread or dispatch sub-group and stored in SRC registers 403 and 404 for use when the SIMT instruction 440 is dispatched during subsequent cycles. Reducing the number of times the SRC registers are accessed reduces the power consumed to read the SRC operands from the register file and write the SRC operands into the SRC pipeline registers.

Further, when all source operands 443 and 444 are scalar, there is no need to redundantly perform operations in the Exec Unit 402 for multiple threads in the thread group. After the first thread or threads in a dispatch sub-group execute the SIMT instruction, the results can be held in the DST register 408 or registers within the exec units 302 or 402 for subsequent threads or threads in a dispatch sub-group to write back to the local register file 304 or other destination. Further still, when the SIMT instruction 440 is identified as scalar, only a single thread or threads in a dispatch sub-group execute the scalar SIMT instruction and write back to the local register file 304 or other destination. These optimizations that reduce the number of cycles for which a SIMT instruction is dispatched based on scalar opcodes and/or instructions improve instruction throughput and reduce energy consumption, whereas the optimizations based on scalar operands primarily reduce energy consumption because fewer register read and write operations are performed.

The execution of memory accesses may be optimized using scalar operands. In conventional multithreaded processors, threads generate memory addresses independently and a memory interface attempts to coalesce the addresses into wide block accesses to the memory system. For example, 32 individual 4-byte word accesses may coalesce into a 128-byte request. Scalar operands may be used by load and store instructions to explicitly encode structured memory access patterns that generate individual thread addresses as a function of a scalar base address summed with the thread's threadID multiplied by a uniform stride. The unified address mapping unit 352 can then directly generate wide block accesses to the memory system based on the scalar operands, without having to first generate individual thread addresses only to coalesce them back together. Eliminating address generation and coalescing can offer significant efficiency savings for many common memory access patterns.

Thus far, temporal execution optimizations for operands and operations that are uniform across a thread group have been described, but the optimization techniques are equally applicable when there are scalar operands and operations across multiple thread groups (e.g. those in a CTA). Generally, a SIMT architecture will have to replicate scalars for each thread group since thread groups execute independently and otherwise there may be read/write hazards. However, in certain cases, such as when data is read-only for a kernel or when multiple thread groups are synchronized, scalar operands may be shared by multiple thread groups.

The optimization techniques are also applicable when operands are only scalar for the threads executed by the same exec unit 302 when multiple exec units 302 are used in the SPM 310, rather than scalar across an entire thread group. In particular, a scalar reduction operand may be identified for threads in a thread group that are processed by the same exec unit 302 when reduction operations are performed across the threads that are processed by the same exec unit 302. When a reduction operation is performed a DST operand is scalar and one or more SRC operands are not scalar. The result of the reduction operation that is stored in the DST output pipeline register 408 only needs to be written to the DST operand register in the local register file 304 or other destination once for all of the active threads in the thread group that are processed by the same exec unit 302, thereby reducing power consumed compared with writing the local register file 304 for each active thread in the thread group.

In one embodiment, dedicated scalar circuitry for performing scalar operations is included within the SPM 310 and scalar instructions are dispatched for execution by the dedicated scalar circuitry. Inputs to the dedicated scalar circuitry may be provided by the DST output pipeline register 408 or the local register file 304. Similarly, outputs from the dedicated scalar circuitry may be stored into the SRC input pipeline registers 403 and/or 404 or the local register file 304. A compiler may be configured to distinguish between scalar operands that are SRC operands for scalar SIMT instructions and scalar operands that are SRC operands for non-scalar SIMT instructions and that information may be used by the instruction dispatch unit 415 to schedule the SIMT instructions for execution by the dedicated scalar circuitry.

Figure 5A:
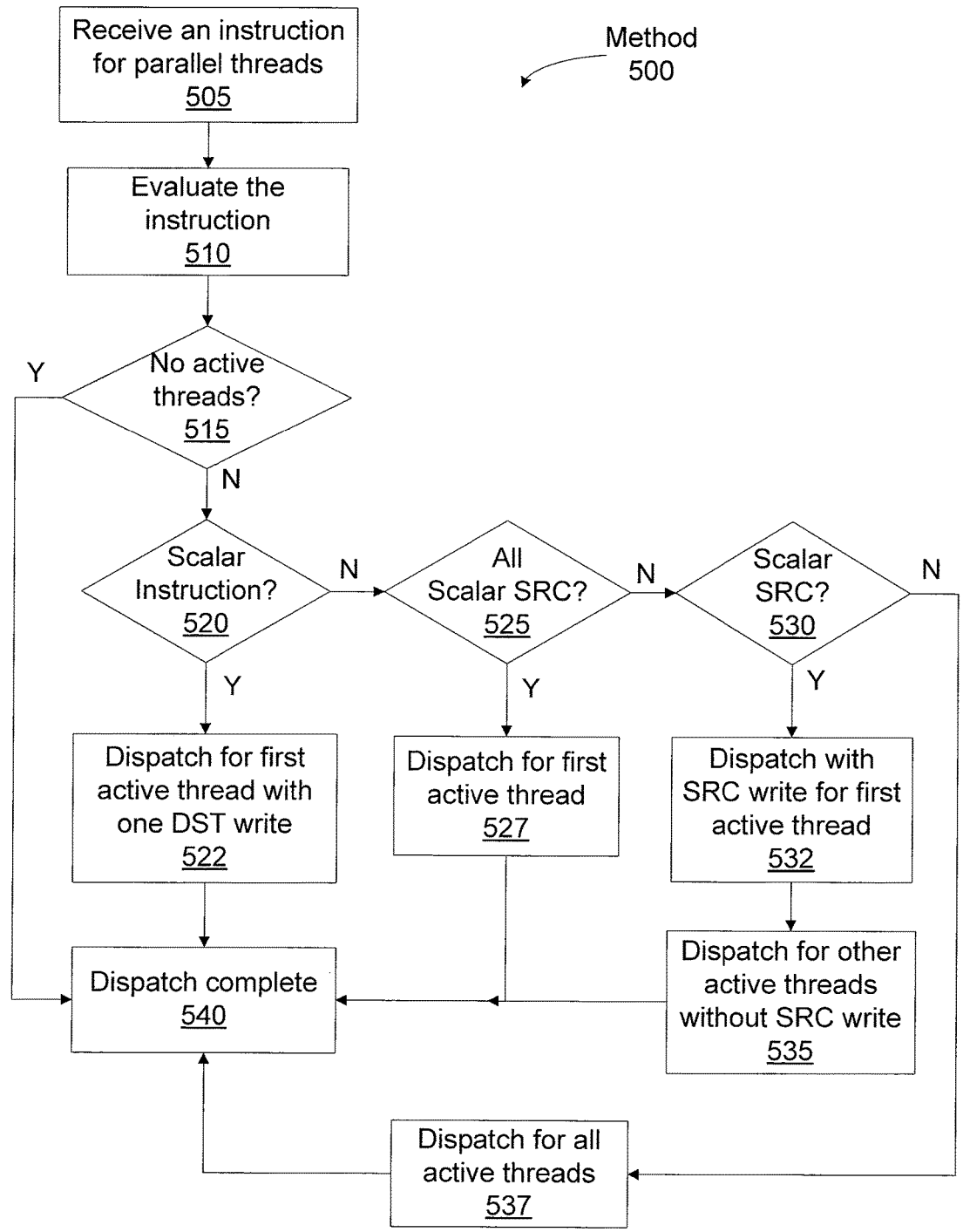
FIG. 5A is a flow diagram of method steps for dispatching an instruction for execution by a thread group, according to one embodiment of the present invention.

FIG. 5A is a flow diagram of method steps for dispatching an instruction for execution by a thread group, according to one embodiment of the present invention. Although the method steps are described in conjunction with the systems of FIGS. 1, 2, 3A, 3B, 3C, and 4A, persons skilled in the art will understand that any system configured to perform the method steps, in any order, is within the scope of the invention. At step 505 a SIMT instruction for execution by parallel threads of a thread group is received by the instruction dispatch unit 415. At step 510 the instruction dispatch unit 415 evaluates the instruction to identify scalar characteristics, e.g., scalar operands and/or opcodes, as described in more detail in conjunction with FIG. 5B.

At step 515 the instruction dispatch unit 415 determines if none of the threads in the thread group are active, and, if so, the instruction dispatch unit 415 proceeds directly to step 540 without dispatching the SIMT instruction. If, at step 515 the instruction dispatch unit 415 determines that at least one of the threads in the thread group is active, then at step 520 the instruction dispatch unit 415 determines if the SIMT instruction is a scalar instruction. If the SIMT instruction is a scalar instruction, then at step 522 the instruction dispatch unit 415 dispatches the SIMT instruction once for the first active thread and writes the DST register to the local register file 304 only for the first active thread. At step 540 dispatch of the SIMT instruction is complete.

If, at step 520 the instruction dispatch unit 415 determines that the SIMT instruction is not a scalar instruction, then at step 525 the instruction dispatch unit 415 determines if the SIMT instruction includes all scalar SRC operands. If the SIMT instruction does include all scalar SRC operands, then at step 527 the instruction dispatch unit 415 dispatches the SIMT instruction only for the first active thread, reading the SRC registers from the local register file 304 only for the first active thread, performing an operation in the Exec Unit 402 only for the first active thread, and writing the DST pipeline register 408 only for the first active thread. The instruction dispatch unit 415 then writes the DST register to the local register file 304 for each one of the active threads. At step 540 dispatch of the SIMT instruction is complete.

If, at step 530, the instruction dispatch unit 415 determines that the SIMT instruction does not include at least one scalar SRC operand, then at step 537 the instruction dispatch unit 415 dispatches the SIMT instruction for all active threads and the SRC registers are loaded for all of the active threads. If the SIMT instruction does include at least one scalar SRC operand, then at step 532 the instruction dispatch unit 415 dispatches the SIMT instruction reading the SRC registers from the local register file 304 only for the first active thread in the thread group. At step 535 the instruction dispatch unit 415 dispatches the SIMT instruction for the other active threads without reading the scalar SRC registers again. The scalar operand is only loaded into the SRC register once, thereby reducing power consumption resulting from a memory access or register file access to transfer the SRC operand to the SRC register. After steps 535 or 537 the instruction dispatch unit 415 proceeds to step 540 and dispatch of the SIMT instruction is complete.

Figure 5B:
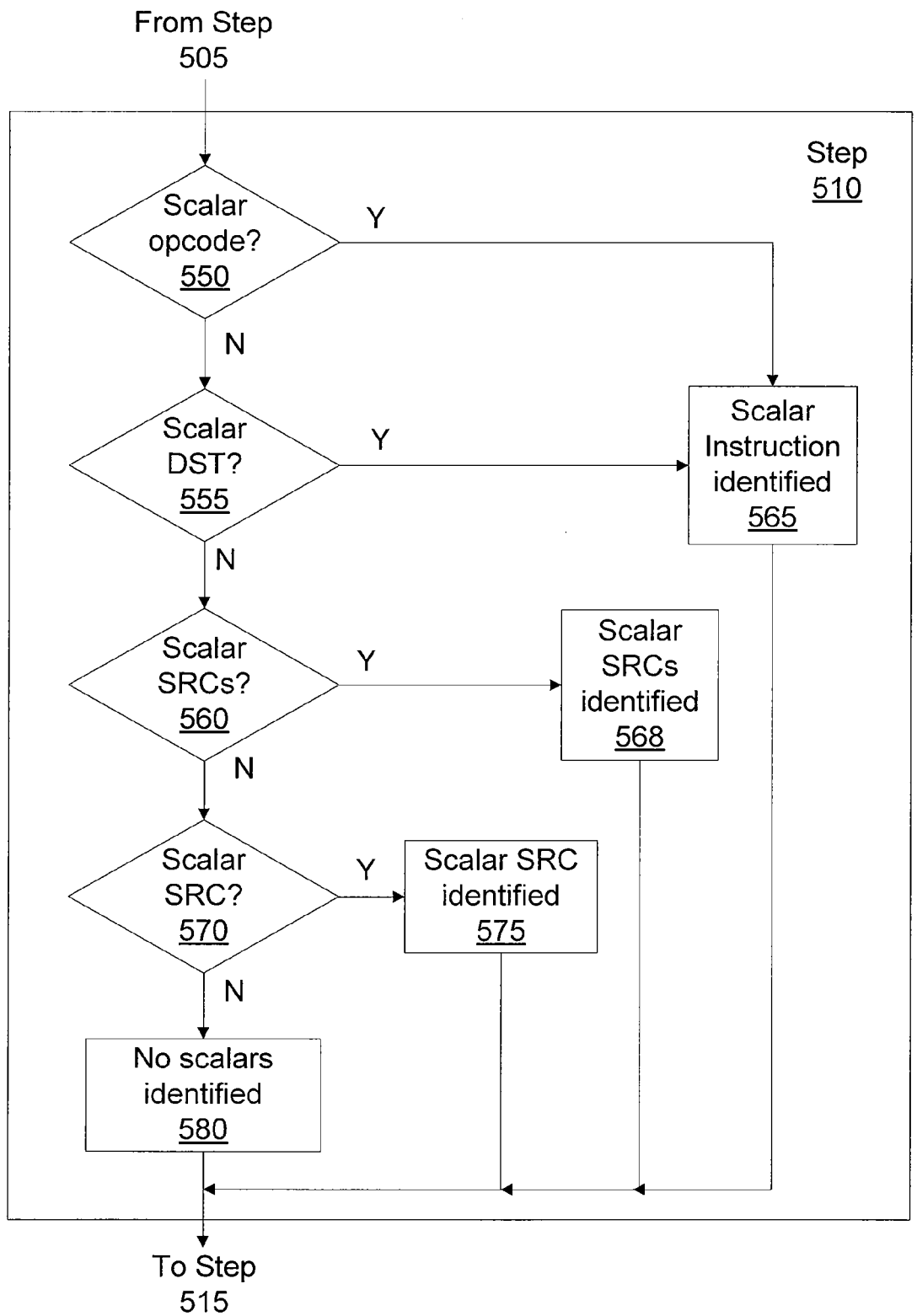
FIG. 5B is a flow diagram of method steps for one of the steps shown in FIG. 5A, according to one embodiment of the present invention.

FIG. 5B is a flow diagram of method steps for step 510 shown in FIG. 5A, according to one embodiment of the present invention. At step 550 the instruction dispatch unit 415 determines if the opcode of the SIMT instruction is a scalar opcode, and, if so, at step 565 the instruction dispatch unit 415 identifies the SIMT instruction as a scalar instruction. Otherwise, at step 555 the instruction dispatch unit 415 determines if all of the DST operands are scalar, and, if so, at step 565 the instruction dispatch unit 415 identifies the SIMT instruction as a scalar instruction. Otherwise, at step 560 the instruction dispatch unit 415 determines if all of the SRC operands are scalars, and, if so, at step 568 the instruction dispatch unit 415 identifies that all of the SRC operands are scalar operands and that the SIMT instruction is not a scalar instruction. Otherwise, at step 570 the instruction dispatch unit 415 determines if any of the SRC operands are scalars, and, if so, at step 575 the instruction dispatch unit 415 identifies each scalar SRC operand as a scalar operand. If, at step 570 the instruction dispatch unit 415 determines that none of the SRC operands are scalars, then at step 580 the instruction dispatch unit has identified that the SIMT instruction is not a scalar instruction and that the SIMT instruction does not include any scalar operands. The instruction dispatch unit 415 then returns to step 515.

TABLE 2 summarizes the optimizations that may be employed based on identification of scalar operands and scalar instructions, as previously described in conjunction with FIGS. 5A and 5B. "Once" indicates that the SIMT instruction is dispatched to Exec Unit 402 once or the local register file 304 is read or written once. "N" indicates that the SIMT instruction is dispatched for each active thread or that the local register file 304 is read or written for each active thread.

TABLE 2

| Inputs | | | | Dispatch Control | | |
|---|---|---|---|---|---|---|
| Scalar Instruction | All Scalar DST operands | All scalar SRC operands | 1+ scalar SRC operands | Dispatch to Exec Unit | Read SRC register | Write DST register |
| Yes | X | X | X | Once | Once | Once |
| X | Yes | Yes | Yes | Once | Once | Once |
| No | No | Yes | Yes | Once | Once | N |
| No | No | No | Yes | N | Once/N | N |
| No | Yes | No | Yes | N | Once/N | Once |

Temporal SIMT optimizations may become increasingly important as physical constraints drive circuit designs toward smaller cores, e.g., SPMs 310 or GPCs 208, with fewer execution units and more localized control and data paths. The temporal SIMT optimizations may reduce the number of times a SIMT instruction is dispatched or may reduce the number of SRC register read operations or DST register write operations, thereby reducing power consumption. Overall, utilization or processing resources is improved and performance may also be increased when temporal SIMT optimizations are employed.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A method of executing an instruction for a thread group, the method comprising:
receiving, by a single-instruction multiple-thread (SIMT) processor, the instruction for execution by the thread group comprising a plurality of threads, wherein the instruction includes one or more flags indicating that the instruction includes at least one of a scalar opcode and a scalar operand;
evaluating the one or more flags included in the instruction to identify the instruction as a scalar instruction; and
in response to identifying the instruction as a scalar instruction, dispatching, by the SIMT processor, the scalar instruction for execution by a portion of the threads in the thread group, wherein the portion of threads comprises at least one but not all threads in the thread group.

2. The method of claim 1, wherein the evaluating includes identification of a source operand as a scalar operand.

3. The method of claim 1, wherein the evaluating comprises identifying the instruction as a scalar instruction based on when an opcode included in the instruction is a scalar opcode.

4. The method of claim 1, wherein source operands included in the instruction are scalar operands.

5. The method of claim 1, wherein the evaluating comprises identifying the instruction as a scalar instruction based on operands included in the instruction.

6. The method of claim 1, wherein the evaluating comprises identifying a source operand included in the instruction as a scalar operand that is read from one source operand register for all of the threads in the thread group.

7. The method of claim 1, further comprising reading a source operand included in the instruction from a source operand register only for a first thread in the thread group that is active when a first flag included in the one or more flags indicates that the source operand is a scalar operand.

8. The method of claim 1, wherein the portion of the threads in the thread group includes only threads in the thread group that are active based on divergence information.

9. The method of claim 1, wherein the portion of threads comprises a single thread in the thread group.

10. The method of claim 1, wherein:
due to divergence, at least one thread in the thread group is inactive and at least one thread in the thread group is active; and
the portion of threads comprises a single active thread in the thread group.

11. The method of claim 1, wherein the evaluating comprises identifying the instruction as a scalar instruction based on at least one of a first determination that an operand included in the instruction is a scalar operand and a second determination that an identifier included in the instruction indicates that the instruction is scalar.

12. The method of claim 1, further comprising:
storing in one or more registers a result of the execution by the portion of the threads in the thread group; and
accessing the result stored in the one or more registers by a second portion of the threads in the thread group, wherein the second portion of the threads in the thread group is not included in the first portion of the threads in the thread group.

13. The method of claim 1, wherein:
the divergence information for the thread group indicates at least one active thread and at least one inactive thread in the thread group; and
the at least one active thread from the thread group is selected for executing the scalar instruction.

14. A non-transitory computer-readable storage medium storing instructions that, when executed by a processor, cause the processor to execute an instruction for a thread group, by performing the steps of:
receiving the instruction for execution by the thread group comprising a plurality of threads, wherein the instruction includes one or more flags indicating that the instruction includes at least one of a scalar opcode and a scalar operand;
evaluating the one or more flags included in the instruction to identify the instruction as a scalar instruction; and
in response to identifying the instruction as a scalar instruction, dispatching the scalar instruction for execution by a portion of the threads in the thread group, wherein the portion of threads comprises at least one but not all threads in the thread group.

15. The non-transitory computer-readable storage medium of claim 14, wherein evaluating comprises identifying the instruction as a scalar instruction when a first flag included in the one or more flags indicates that an opcode included in the instruction is a scalar opcode.

16. The non-transitory computer-readable storage medium of claim 14, wherein evaluating comprises identifying the instruction as a scalar instruction when the one or more flags indicate that all destination operands included in the instruction are scalar operands.

17. A system for executing instructions, the system comprising:
a memory that is configured to store instructions for execution by threads; and
a single-instruction multiple-thread (SIMT) processor that is configured to:
receive an instruction for execution by a thread group comprising a plurality of threads, wherein the instruction includes one or more flags indicating that the instruction includes at least one of a scalar opcode and a scalar operand;
evaluate the one or more flags included in the instruction to identify the instruction as a scalar instruction; and
in response to identifying the instruction as a scalar instruction, dispatch the scalar instruction for execution by a portion of the threads in the thread group, wherein the portion of threads comprises at least one but not all threads in the thread group.

18. The system of claim 17, wherein the SIMT processor is further configured to identify a source operand as a scalar operand.

19. The system of claim 17, wherein the SIMT processor is further configured to identify the instruction as a scalar instruction when an opcode included in the instruction is a scalar opcode.

20. The system of claim 17, wherein all source operands included in the instruction are scalar operands.

21. The system of claim 17, wherein the SIMT processor is further configured to identify the instruction as a scalar instruction based on operands included in the instruction.

22. The system of claim 17, wherein the SIMT processor is further configured to identify a source operand included in the instruction as a scalar operand that is read from one source operand register for all of the threads in the thread group.

23. The system of claim 17, wherein the SIMT processor is further configured to read a source operand included in the instruction from a source operand register only for a first thread in the thread group that is active when a first flag included in the one or more flags indicates that the source operand is a scalar operand.

24. The system of claim 17, wherein the SIMT processor is further configured to write a destination operand register only once when a first flag included in the one or more flags indicates that the destination operand is a scalar operand.

25. The system of claim 17, wherein the portion of the threads in the thread group includes only threads in the thread group that are active based on divergence information.

26. A method of executing an instruction across a thread group comprising a plurality of threads, the method comprising:
  receiving, by a processor, the instruction for execution across the thread group, wherein the instruction includes one or more flags indicating that the instruction includes at least one of a scalar opcode and a scalar operand;
  evaluating the one or more flags included in the instruction to identify the instruction as a scalar instruction;
  in response to identifying the instruction as being a scalar instruction, dispatching, by the processor, the scalar instruction for execution by a portion of the threads included in the thread group, wherein the portion of threads comprises at least one but not all of threads included in the thread group; and
  in response to identifying the instruction as not being a scalar instruction, dispatching, by the processor, the instruction for execution by a second portion of threads in the thread group that is selected based on divergence information for the thread group.

* * * * *